United States Patent [19]
Burgdorf et al.

[11] 3,865,215
[45] Feb. 11, 1975

[54] SPOT-TYPE DISC BRAKE

[75] Inventors: Jochen Burgdorf, Offenbach;
Roberto Stoka, Frankfurt/Main,
both of Germany

[73] Assignee: ITT Industries, Inc., New York, N.Y.

[22] Filed: June 17, 1974

[21] Appl. No.: 480,070

[30] Foreign Application Priority Data
Aug. 9, 1973 Germany .................... 2340241

[52] U.S. Cl. ............................................. 188/73.6
[51] Int. Cl. ............................................. F16d 65/00
[58] Field of Search ....... 188/73.6, 73.5, 73.4, 73.3, 188/72.4

[56] References Cited
UNITED STATES PATENTS

| | | | |
|---|---|---|---|
| 3,525,420 | 8/1970 | Honick et al. ..................... | 188/73.6 |
| 3,605,956 | 9/1971 | Hahm et al. ........................ | 188/73.6 |
| 3,616,879 | 11/1971 | Pauwels ............................. | 188/73.6 |
| 3,625,314 | 12/1971 | Rinker ................................ | 188/73.5 |
| 3,782,510 | 1/1974 | Rath .................................... | 188/73.5 |

FOREIGN PATENTS OR APPLICATIONS

| | | | |
|---|---|---|---|
| 1,373,760 | 8/1964 | France .............................. | 188/73.3 |

*Primary Examiner*—George E. A. Halvosa
*Assistant Examiner*—Edward R. Kazenske
*Attorney, Agent, or Firm*—John T. O'Halloran;
Menotti Lombardi, Jr.; Alfred C. Hill

[57] ABSTRACT

There is disclosed a spot-type disc brake having a brake carrier protruding over the brake disc and brake shoes on each side of the disc, one shoe being directly actuated by a hydraulically actuated piston and the other shoe being actuated by a brake caliper embracing the disc. A sliding guide is provided to connect the caliper to the carrier so that the caliper is movable relative to the carrier towards and away from the disc. The sliding guide includes guide portions having grooves in the caliper and projections in the carrier to engage the grooves. An opening is provided in the caliper so that the brake shoe adjacent the actuating device can be removed without disassembling the caliper from the carrier. The guide portions have a limited length so that when the caliper is shifted into the space left by the removed brake shoe, the guide portions can be disengaged. This arrangement provides a positive arrangement to prevent the caliper and carrier from separating during operation without additional components in the guide portions as is present in similar prior art disc brakes.

9 Claims, 5 Drawing Figures

SPOT-TYPE DISC BRAKE

BACKGROUND OF THE INVENTION

This invention relates to a spot-type disc brake, especially for motor vehicles, having a rotary brake disc and a non-rotating brake carrier protruding over the brake disc, the brake carrier receiving the brake torque. Brake shoes are disposed on both sides of the brake disc. A brake caliper is also provided embracing the edge of the brake disc and transmitting the actuating force of an actuating device, which is disposed on only one side of the brake disc and directly acting on one brake shoe, to the brake shoe disposed on the other side of the brake disc. There is also provided a sliding guide connecting the brake caliper to the brake carrier in a way that the brake caliper is movable in relation to the brake carrier in the direction of the brake disc, the sliding guide including guide portions which are arranged a distance from each other in the peripheral direction of the disc and includes grooves and projections engaging in these grooves.

Spot-type disc brakes of this type require a brake caliper/brake carrier connecting sliding guide which permits a simple mounting and dismounting of the brake caliper in order to facilitate maintenance, and which on the other hand guarantees a high degree of security against the uncontrolled detachment of the brake caliper from the brake carrier.

From U.S. Pat. No. 3,616,879 a spot-type disc brake of the type mentioned at the outset is known, wherein the brake caliper is designed with lips projecting laterally which engage in guide grooves in the brake carrier. Fillers made of sheet-metal are inserted between the lips and the guide grooves. After these fillers have been removed, such a large clearance between the lips and the guide grooves is created that the brake caliper can be dismounted from the brake carrier in radial direction with respect to the brake disc. However, these additional fillers raise the manufacturing costs of the brake. Moreover, these fillers must be reliably secured against dropping out.

SUMMARY OF THE INVENTION

It is an object of this invention to provide a connection between brake caliper and brake carrier of a brake of the type mentioned at the outset, wherein additional members can be dispensed with and which is highly secured against the uncontrolled detachment of the brake caliper from the brake carrier.

A feature of the present invention is the provision of a spot-type disc brake comprising: a rotating brake disc having an axis of rotation; a non-rotating brake carrier protruding over the disc to receive brake torque; a brake caliper embracing the edge of the disc; a hydraulical actuating device carried by the caliper; a pair of brake shoes, one of the shoes being disposed on one side of the disc adjacent the actuating device and actuated thereby and the other of the shoes being disposed on the other side of the disc actuated by the caliper; a sliding guide connecting the caliper to the carrier in a manner such that the caliper is movable relative to the carrier toward and from the disc, the sliding guide including guide portions which are separated from each other in a direction of the periphery of the disc, the guide portions having grooves in one of the caliper and the carrier and projections engaging the grooves carried by the other of the caliper and the carrier; and an opening provided in one of the carrier and the caliper through which the one of the shoes can be dismounted without disassembling the caliper and the carrier; the length of the guide portions being limited to such a value that, when the caliper is shifted into a hollow space formed by dismounting the one of the shoes, the guide portions disengage, thereby enabling a disassembly of the caliper and the carrier.

This arrangement provides a positive-engagement connection between brake carrier and brake caliper which is locked by the brake disc and the brake shoe adjacent to the actuating device so that no additional members are necessary. Moreover, the surface where the guide portions at the brake carrier and at the brake caliper overlap becomes advantageously larger with advancing wear because the brake caliper performs a movement in order that the brake shoe arranged on the side of the brake disc remote from the actuating device is allowed to abut the brake caliper. This movement is opposed to the movement performed in order to dismount the brake caliper. Accordingly, when the brake is assembled, the minimum surface of overlapping of the guide portions can never be smaller than the thickness of the brake shoe adjacent to the actuating device, when it is new.

In order to be able to replace the brake shoe adjacent to the actuating device in a simple manner, the section of the brake caliper protruding over the brake disc is, according to another feature of this invention, designed with a central opening through which the brake shoe can be removed. It is favorable to lock this opening via a spring clip, which presses the brake shoe against the contact surfaces in the brake carrier and prevents rattling of the brake shoe when the brake is released.

In order to avoid a too larger overall width of the brake caliper, according to a further feature of this invention the brake shoe adjacent to the actuating device can be designed with a smaller tangential width and a larger thickness than the opposite brake shoe. Thus, both brake shoes have approximately the same wearable amount of friction material, and consequently approximately the same lifetime.

It is still another feature of this invention to design the brake carrier with a tangential opening through which the brake shoe adjacent to the actuating device can be dismounted. In this arrangement, the section of the brake caliper protruding over the brake disc can be compactly designed resulting in a higher rigidity of the brake carrier. If the brake is provided with a hydraulical actuating device, it is favorable to fasten the brake shoe adjacent to the actuating device to the brake piston having central hole which engages a projection carried by the backing plate of the brake shoe. In order to replace the brake shoe, the brake piston must be allowed to move back by the length of this projection.

In order to be able to replace the brake shoe on the side of the brake disc remote from the actuating device without dismounting the brake caliper, the width of its associated lateral supporting surfaces at the brake caliper or at the brake carrier is smaller than the thickness of the other brake shoe adjacent to the actuating device. From this ensues that, after the brake shoe adjacent to the actuating device has been dismounted, the other brake shoe can be detached from its supporting surfaces by shifting the brake caliper, before the guide portions at the brake caliper and at the brake carrier disengage. Moreover, it is still a further feature of the guide connecting the brake caliper to the brake carrier that the section of the brake caliper protruding over the brake disc is provided with grooves at its parallel lateral surfaces, and that the brake carrier embraces the brake caliper with two arms on which projections are disposed in the direction of the brake disc at a distance from each other, the projections engaging the grooves. In this arrangement, the groove walls, defining the grooves in the direction of the disc, advantageously are designed with apertures extending from the side of the guide projections adjacent to the actuating device, the width of which is larger than the width of the guide projections.

When the inventive spot-type disc brake is used as brake for motor vehicles, further advantages are that the brake carrier can be integrally formed with the steering knuckle or with another member of the wheel suspension of the vehicle, because brake caliper and brake disc can be dismounted without detaching the brake carrier. Furthermore, the brake permits the use of brake shoes with large friction surfaces, which results in a longer life of the pads and in longer intervals for the maintenance of the brake. The guide of the brake caliper is insensitive to corrosion and does not tend to jam on account of the large axial support width.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
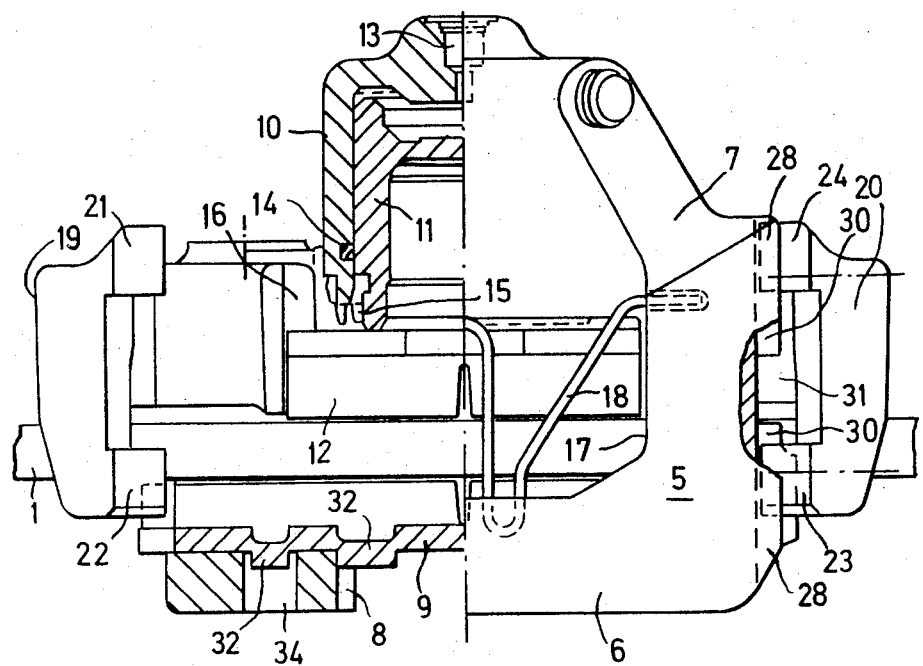
FIG. 1 shows a top view of a spot-type disc brake, partially in cross section, in accordance with the principles of the present invention.
Figure 2:
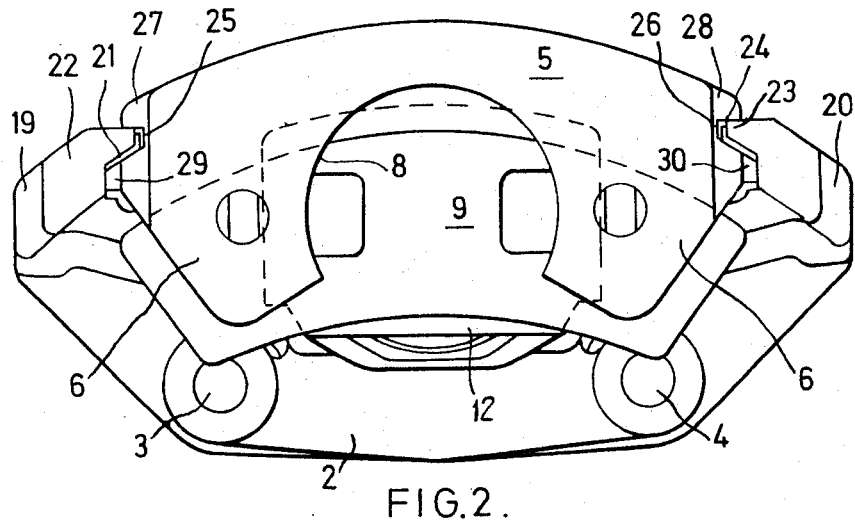
FIG. 2 shows a front view of the brake of FIG. 1.
Figure 3:
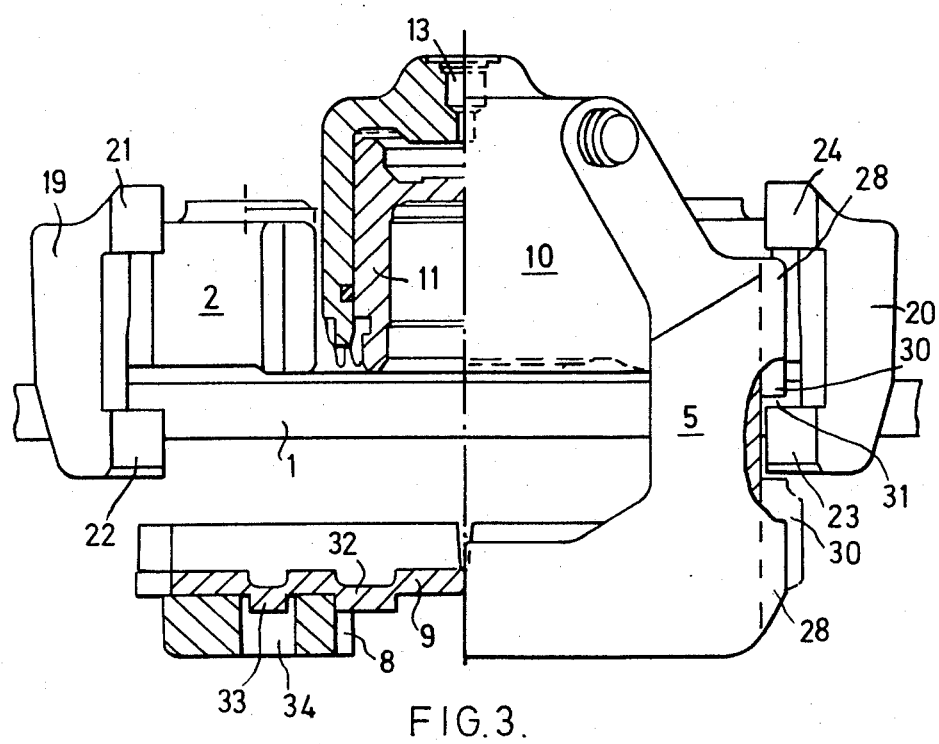
FIG. 3 shows a top view of the brake of FIG. 1 with the brake caliper shifted to be dismounted.

The spot-type disc brake illustrated in FIGS. 1 to 3 includes the brake disc 1, the brake carrier 2 protruding over the brake disc and having the mounting eyes 3 and 4, and the brake caliper 5 which is guided and held by the brake carrier 2. Brake caliper 5 embraces the brake disc with its side pieces 6 and 7. Side piece 6 which is divided into two arms by the central hole 8 carries brake shoe 9. The side piece 7 forms the cylinder housing 10 of the hydraulical actuating device acting on brake shoe 12 via brake piston 11. The pressure medium is fed via connector 13. The necessary sealing of the piston 11 and housing 10 is provided by a seal 14 and a dust hood 15. Brake shoe 12 is held and guided in a channel 16 of the brake carrier and can be mounted and dismounted through a central opening 17 in brake caliper 5. In order to fasten brake shoe 12, a spring clip 18 is provided which is locked into brake caliper 5 and presses brake shoe 12 against the supporting surfaces in channel 16 of brake carrier 2.

In order to guide and fasten brake caliper 5, brake carrier 2 is designed with arms 19 and 20 essentially extending radially from disc 1. Arms 19 and 20 laterally embrace the middle section of brake caliper 5 protruding over brake disc 1. Arms 19 and 20 are designed with projections 21, 22, 23 and 24 engaging grooves 25 and 26 which are arranged in the lateral surfaces of brake caliper 5 parallel to the axis of brake disc 1. The lower lateral walls 29 and 30 of grooves 25 and 26 facing brake disc 1 are designed with apertures 31 in their middle regions, which extend to the bottoms of the grooves, and the width of which is larger than the width of projections 22 and 23. As seen in the direction of the longitudinal grooves, projections 21, 22 and 23, 24 are arranged a distance from each other which amounts to a multiple of their width. When the brake is mounted and the brake shoes are new, as shown in FIG. 1, projections 21 and 24 are disposed close to the ends of grooves 25 and 26 facing cylinder housing 10, and the projections 22 and 23 are disposed close to the side of the apertures 31 remote from the actuating device. Projections 22 and 23 are arranged a distance from the opposite ends of grooves 25 and 26 and projections 21 and 24 a distance from apertures 31 which distance corresponds to about the thickness of the friction pad of brake shoe 9. The upper lateral walls 27 and 28 of grooves 25 and 26 remote from brake disc 1 are designed as plane surfaces.

In order to be able to dismount brake caliper 5 without detaching brake carrier 2 from its support, this may be necessary, e.g., in order to dismount the brake disc, the brake shoe 12 has to be dismounted first. This is done by detaching and removing spring clip 18, whereby opening 17 in brake caliper 5 is no longer locked so that it is possible to radially pull brake shoe 12 out of brake carrier 2 through opening 17. After brake shoe 12 has been dismounted, a hollow space is created in channel 16 of brake carrier 2, into which hollow space side piece 7 with cylinder housing 10 and brake piston 11 can be moved by shifting brake caliper 5. FIG. 3 shows the position of brake caliper 5 in relation to brake carrier 2, said position being achievable owing to the above-mentioned movement. As soon as brake caliper 5 is shifted by a degree corresponding to the original thickness of brake shoe 12, projections 21 and 24 at the ends facing cylinder housing 10, and projections 22 and 23 at apertures 31 disengage grooves 25 and 26 so that brake caliper 5 can be removed out of brake carrier 2 in a radial direction in relation to brake disc 1.

Mounting brake caliper 5 is performed in reverse sequence. By inserting brake shoe 12, brake caliper 5 is prevented from shifting into the position illustrated in FIG. 3, because brake disc 1 and brake carrier 2 are immovable in relation to one another in the direction of the brake disc.

In order to replace brake shoe 9, after brake shoe 12 has been dismounted, brake caliper 5 has to be shifted only so far towards the final position illustrated in FIG. 3 that the projections 32 and 33 on the back side of brake shoe 9 are allowed to come out of holes 8 and 34. Subsequently, brake shoe 9 can be removed from brake caliper 5 by shifting in a tangential direction. Since projections 32 and 33 are shorter than the overlapping length between grooves 25 and 26 and projections 21 to 24, brake caliper 5 does not drop out of its sliding guide when brake shoe 9 is replaced.

As can be learned especially from FIG. 1, the length of the sections of the lower lateral walls 29 and 30 extending from projections 21 and 24 to apertures 31, and from projections 22 and 23 to the ends of the grooves 25, 26 remote from the actuating device is equal to, when the brake caliper is in its mounting position, and when brake shoes 9, 12 are new, the thickness, or is longer than the thickness, of the wearable friction pad of brake shoe 9. This arrangement avoids, due to a movement of brake caliper 5 with its side piece 6 in the direction of the brake disc 1, the projections from coming out of the grooves when wear of brake shoe 9 advances. On the contrary, the projections and the grooves remain in complete overlapping relationship until brake shoe 9 is completely worn. Thus, there is no danger of an uncontrolled detachment of the brake caliper from the brake carrier, particularly since the operating shifting movement of brake caliper 5 is opposed to the movement necessary to dismount the brake caliper.

Figure 4:
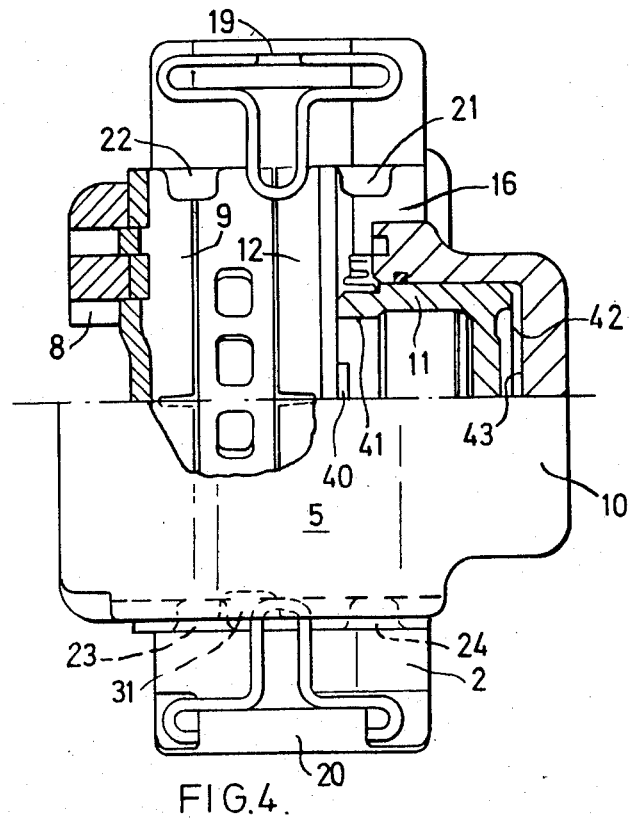
FIG. 4 shows a top view, partially in cross-section of a spot-type disc brake in accordance with the principles of the present invention with equal-sized brake shoes.
Figure 5:
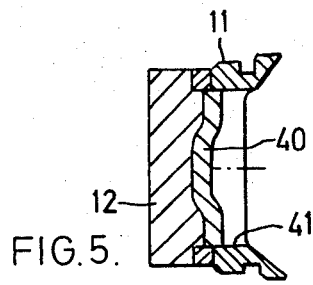
FIG. 5 shows a partial cross-sectional view through the brake shoe and the brake piston of the brake of FIG. 4.

FIGS. 4 and 5 show another embodiment of a spot-type disc brake in accordance with the principles of the present invention wherein brake shoe 12 adjacent the actuating device is not radially dismountable out of the brake carrier, but is tangentially dismountable. The members in this embodiment, corresponding to those in the embodiment according to FIGS. 1 to 3, are marked with the same reference numerals. In FIG. 4, brake shoe 12 is only supported with its radially outer section of its lateral surfaces at the arms 19 and 20, and is designed with a projection 40 on its back side projecting into the central hole 41 of brake piston 11. The height of projection 40 corresponds to the interspace, existing in this brake, between the bottom surface 42 of brake piston 11 and the bottom surface 43 of cylinder housing 10.

Brake shoe 12 can be dismounted by shifting brake piston 11 into cylinder housing 10 until bottom surfaces 42 and 43 contact. When brake piston 11 is in this position, projection 40 comes out of hole 41 so that brake shoe 12 can be moved in the direction of the brake disc. Before brake shoe 12 is prevented from a further shifting in this direction by the members carrying brake carrier 2, the brake shoe comes out of the guide surfaces at the arms 19 and 20 of brake carrier 2, and, consequently, can be removed in tangential direction through an opening in brake carrier 2.

This fastening of brake shoe 12 has the advantage that brake shoe 12 can be made wide in the tangential direction, since it is not necessary to provide an opening in brake caliper 5 with this width. Correspondingly, brake caliper 5 can be designed more rigid. Moreover, additional fastening members for brake shoe 12, as, e.g., spring clip 18, can be dispensed with.

While we have described above the principles of our invention in connection with specific apparatus it is to be clearly understood that this description is made only by way of example and not as a limitation to the scope of our invention as set forth in the objects thereof and in the accompanying claims.

We claim:

1. A spot-type disc brake comprising:
a rotating brake disc having an axis of rotation;
a non-rotating brake carrier protruding over said disc to receive brake torque;
a brake caliper embracing the edge of said disc;
a hydraulical actuating device carried by said caliper;
a pair of brake shoes, one of said shoes being disposed on one side of said disc adjacent said actuating device and actuated thereby and the other of said shoes being disposed on the other side of said disc actuated by said caliper;
a sliding guide connecting said caliper to said carrier in a manner such that said caliper is movable relative to said carrier toward and from said disc, said sliding guide including guide portions which are separated from each other in a direction of the periphery of said disc, said guide portions having grooves in one of said caliper and said carrier and projections engaging said grooves carried by the other of said caliper and said carrier; and
an opening provided in one of said carrier and said caliper through which said one of said shoes can be dismounted without disassembling said caliper and said carrier;
the length of said guide portions being limited to such a value that, when said caliper is shifted into a hollow space formed by dismounting said one of said shoes, said guide portions disengage, thereby enabling a disassembly of said caliper and said carrier.

2. A brake according to claim 1, wherein
a section of said caliper protruding over said disc includes said opening.

3. A brake according to claim 2, further including
a spring clip secured to said caliper to block said opening and to press said one of said shoes against brake shoe contact surfaces provided in said carrier.

4. A brake according to claim 3, wherein
said one of said shoes has a smaller tangential width and a larger thickness than said other of said shoes, and
both of said shoes have approximately the same wearable amount of friction material.

5. A brake according to claim 4, further including
lateral supporting surfaces in one of said caliper and said carrier to support said other of said shoes,
said lateral support surfaces have a width smaller than the thickness of said one of said shoes.

6. A brake according to claim 5, wherein said guide portions includes
grooves disposed in surfaces of a section of said caliper protruding over said disc parallel to said axis of said disc,
a pair of arms extending from said carrier to embrace said disc, each of said arms having spaced projections to engage an associated one of said grooves.

7. A brake according to claim 6, further including
apertures disposed in a wall of one of said grooves adjacent said actuating device, said apertures extending from said projections adjacent said actuating device to said actuating device, said apertures having a width larger than the width of said projections.

8. A brake according to claim 1, wherein
said opening is a tangential opening in said brake carrier through which said one of said shoes can be dismounted.

9. A brake according to claim 8, wherein said actuating device includes
a cylinder having a bottom wall transverse thereof, and an actuating piston disposed in said cylinder having a central hole in an end thereof adjacent said one of said shoes; and said one of said shoes includes a backing plate having a central projection engaging said central hole;

an end of said piston adjacent said bottom wall is spaced from said bottom wall an amount at least equal to the length of said projection so that said piston can move toward said bottom wall an amount equal to the length of said projection for ease of dismounting said one of said shoes through said opening.

* * * * *